US007760820B2

(12) United States Patent
Lei et al.

(10) Patent No.: US 7,760,820 B2
(45) Date of Patent: Jul. 20, 2010

(54) RECEIVER HAVING A SIGNAL RECONSTRUCTING SECTION FOR NOISE REDUCTION, SYSTEM AND METHOD THEREOF

(75) Inventors: Zhongding Lei, Singapore (SG); Yan Wu, Singapore (SG); Chin Keong Ho, Singapore (SG); Sumei Sun, Singapore (SG); Ping He, Singapore (SG); Yuan Li, Singapore (SG)

(73) Assignee: Agency For Science, Technology And Research, Singapore (SG)

( * ) Notice: Subject to any disclaimer, the term of this patent is extended or adjusted under 35 U.S.C. 154(b) by 401 days.

(21) Appl. No.: 10/525,451

(22) PCT Filed: Aug. 28, 2002

(86) PCT No.: PCT/SG02/00194

§ 371 (c)(1),
(2), (4) Date: Jun. 7, 2006

(87) PCT Pub. No.: WO2004/032347

PCT Pub. Date: Apr. 15, 2004

(65) Prior Publication Data

US 2006/0258316 A1 Nov. 16, 2006

(51) Int. Cl.
*H04L 27/06* (2006.01)
(52) U.S. Cl. .................. 375/340; 375/135; 375/148; 375/147; 375/341
(58) Field of Classification Search ............... 375/340, 375/135, 148, 147, 341
See application file for complete search history.

(56) References Cited

U.S. PATENT DOCUMENTS

| 6,067,292 A * | 5/2000 | Huang et al. ............ 370/342 |
| 6,654,408 B1 * | 11/2003 | Kadous et al. ............ 375/148 |
| 2002/0131537 A1 * | 9/2002 | Storm et al. ............ 375/350 |
| 2003/0002568 A1 * | 1/2003 | Dabak et al. ............ 375/148 |

* cited by examiner

*Primary Examiner*—Shuwang Liu
*Assistant Examiner*—Kabir A Timory
(74) *Attorney, Agent, or Firm*—Pyprus Pte Ltd

(57) ABSTRACT

A signal reconstructing section (50), a receiver having the signal reconstructing section (50), a communication system having the receiver, and a method for reducing noise in a transformed signal having a plurality of signal components and using the signal reconstructing section (50) are described. The signal reconstructing section (50) of the receiver has a detector (52) for detecting the transformed signal, decision modules (54) each having an input (58) coupled to output (60) of the detector, and a reconstructing module (56) having inputs (62) respectively coupled to output (64) of the decision modules (54). The reconstructing module (56) is adapted to reconstruct one or more subcarriers of the plurality of subcarriers a predetermined number of times to thereby form a noise-reduced transformed signal. Reconstruction of the one or more subcarriers is performed one at a time or two or more simultaneously.

33 Claims, 6 Drawing Sheets

RECEIVER HAVING A SIGNAL RECONSTRUCTING SECTION FOR NOISE REDUCTION, SYSTEM AND METHOD THEREOF

FIELD OF THE INVENTION

The present invention relates to noise reduction in receivers of communication systems. In particular, the present invention relates to a receiver having a signal reconstructing section for noise reduction, system and method thereof.

BACKGROUND OF THE INVENTION

Mobile radio systems have to be highly spectral efficient to allow high user capacities and high data rates. Multicarrier modulation realized by orthogonal frequency division multiplexing (OFDM) is well suited for high data rate applications in fading channels and has been chosen for several new standards like digital audio broadcasting (DAB) and broadband LAN standards such as, for example, HIPERLAN/2, IEEE 802.11 and Multimedia Mobile Access Communications (MMAC) respectively.

Code-division multiple access (CDMA) is a multiplexing technique where a number of users simultaneously access a channel by modulating and spreading their information-bearing signals with pre-assigned signature sequences. Recently, the concept of combining OFDM signaling with CDMA to provide a multicarrier CDMA scheme has attracted significant research interests. One major advantage of the multicarrier CDMA scheme is that symbol rate can be lowered for each subcarrier. In other words, longer symbol duration enables easier quasi-synchronizing of transmissions in communication systems having the multicarrier CDMA scheme.

The multicarrier CDMA scheme is categorized into two main groups. One group spreads an original data stream in the time domain such as multicarrier Direct Sequence (DS)-CDMA and multi-tone (MT) CDMA. The latter group performs the spreading operation in the frequency domain, transmitting all the chips of a spread symbol at the same time, but in different orthogonal sub-channels. Communication systems in the latter group are commonly referred to as MC-CDMA communication systems. FIG. 1 is a general block diagram of a prior art MC-CDMA communication system 10 having a transmitter 12 and a receiver 14. A channel 16 provides a communication medium for signals to be transmitted from the transmitter 12 to the receiver 14, which processes received signal input 18 corresponding to transmitted signals.

Various detectors have been proposed and analyzed for MC-CDMA communication systems. For example, in "Performance of CDMA/OFDM for mobile communication systems" [$2^{nd}$ IEEE International Conference on Universal Personal Communications (ICUPC), pp. 975-979, 1993] K. Fazel describes an optimal Maximum Likelihood Detector (MLD). However, as complexity grows exponentially with the number of users, the MLD can be used only for a small number of interfering users. This difficulty led to the consideration of sub-optimal but simpler detectors. Such simpler detectors include Equal Gain Combining (EGC) detectors, Maximum Ratio Combining (MRC) detectors, Minimum Mean Square Error (MMSE) combining detectors, Multi-User Detectors (MUD) for interference cancellation, Orthogonality Restoring Combining (ORC) detectors, and ORC with Threshold (TORC) detectors that is also known as controlled equalization.

Of the above detectors, only an ORC detector can effectively eliminate multi-user interference and there is no error floor in the bit-error-rate (BER) performance. However, noise components are amplified at weaker subcarriers in a receiver having the ORC detector. The weaker a subcarrier, the higher the noise amplification of that subcarrier. To address this problem, TORC detectors are proposed to suppress excessive noise by setting a threshold for signal amplitudes. Components corresponding to weaker subcarriers that have amplitudes smaller than the threshold are discarded. Noise level is reduced with rising threshold in the TORC detector because fewer weak subcarriers are accepted. However, for TORC detectors, orthogonality of signals is destroyed and, consequently, interference results. As more subcarriers are discarded, the interference that is introduced increases. BER depends on noise level as well as the interference. The interference is especially responsible for error floor at high signal-to-noise ratios (SNR).

Considering both effects of excessive noise amplification and interference, an MMSE detector compromises between these two effects. When noise level is low (higher SNR), the MMSE detector works similarly to ORC detector to recover orthogonality amongst users. When noise level is high (lower SNR), the MMSE detector reduces the noise. In this way, the MMSE detector can suppress the excessive noise amplification without error floor in the high SNR region. However, system performance between the MMSE detector and the optimal MLD detector is still quite large.

Therefore, a need clearly exists for an MC-CDMA receiver that alleviates excessive noise amplification of weak subcarriers in general and interference in particular when MMSE or TORC detectors are used in the MC-CDMA receiver. Furthermore, such an MC-CDMA receiver should accommodate more users without substantially increasing complexity when compared with existing MC-CDMA receivers having MLD detectors.

SUMMARY OF THE INVENTION

The present invention seeks to provide a signal reconstructing section, a receiver having the signal reconstructing section, a communication system having the receiver and a method for reducing noise in a transformed signal using the signal reconstructing section in accordance with a preferred embodiment of the invention.

Accordingly, in one aspect, the present invention provides, in a receiver of a communication system, a method for reducing noise in a transformed signal, the transformed signal having a plurality of signal components, the method comprising the steps of:

receiving a transformed signal by a detector of the communication system;

processing the transformed signal; and reconstructing a predetermined number of times, by a reconstructing module, one or more signal components of the plurality of signal components, the reconstructing being based upon the processing step to thereby reduce noise in the transformed signal.

In another aspect, the present invention provides a receiver for reducing noise in a transformed signal, the transformed signal having a plurality of signal components, the receiver comprising:

a signal reconstructing section having:

a detector for detecting the transformed signal;

one or more decision modules, each of the one or more decision modules having an input coupled to output of the detector; and a reconstructing module having one or more inputs, the one or more inputs being respectively coupled to output of the one or more decision modules, wherein the reconstructing module is adapted to reconstruct one or more signal components of the plurality of signal components a predetermined number of times to thereby form a noise-reduced transformed signal.

In yet another aspect, the present invention provides a communication system comprising:

a signal reconstructing section for reducing noise in a transformed signal, the transformed signal having a plurality of signal components, the signal reconstructing section having:

a detector for detecting the transformed signal;

one or more decision modules, each of the one or more decision modules having an input coupled to output of the detector; and a reconstructing module having one or more inputs, the one or more inputs being respectively coupled to output of the one or more decision modules, wherein the reconstructing module is adapted to reconstruct one or more signal components of the plurality of signal components by a predetermined number of times to thereby form a noise-reduced transformed signal.

In still another aspect, the present invention provides a signal reconstructing section for a receiver to reduce noise in a transformed signal, the transformed signal having a plurality of signal components, the signal reconstructing section comprising:

a detector for detecting the transformed signal;

one or more decision modules, each of the one or more decision modules having an input coupled to output of the detector; and a reconstructing module having one or more inputs, the one or more inputs being respectively coupled to output of the one or more decision modules, wherein the reconstructing module is adapted to reconstruct one or more signal components of the plurality of signal components by a predetermined number of times to thereby form a noise-reduced transformed signal.

BRIEF DESCRIPTION OF THE DRAWINGS

A preferred embodiment of the present invention is more fully described and contrasted with prior art, by way of example, with reference to the drawings of which.

DETAILED DESCRIPTION OF THE DRAWINGS

A signal reconstructing section, a receiver having the signal reconstructing section, a communication system having the receiver and a method for reducing noise in a transformed signal using the signal reconstructing section in accordance with a preferred embodiment of the invention are described. In the following description, details are provided to describe the preferred embodiment. It shall be apparent to one skilled in the art, however, that the invention may be practiced without such details. Some of these details may not be described at length so as not to obscure the invention.

There are many advantages of the invention. One advantage of the invention is that replacing at least one weak signal component of the transformed signal with corresponding at least one reconstructed signal component enables reduction of noise amplification from weak signal components. Consequently, a noise-reduced transformed signal is formed after replacement of the at least one weak signal component.

Another advantage of the invention is that there is no error floor at high signal-to-noise ratios (SNR) when applied with conventional detectors such as ORC detectors due to absence of interference. This is because no signal component is abandoned and therefore orthogonality of signal components of the transformed signal is not destroyed. Consequently, bit error rate (BER) is improved without adversely affecting orthogonality performance of a detector of the signal reconstructing section.

Yet another advantage of the invention is that the method is simple to apply without complex and tedious processing. Furthermore, the signal reconstructing section can be applied using, among other things, conventional detectors. Therefore, implementation of the method or the signal reconstructing section does not require substantial additional costs or overheads.

A further advantage of the invention is that the signal reconstructing section is not restricted to multicarrier communication systems but also applicable to many other communication systems such as, for example, pre-transformed OFDM (PT-OFDM including WHT-OFDM) and SC-FDE systems.

It is to be noted that signal components in the following description is not restricted to a specific signal domain. The invention applies to any domain (frequency, time, space, etc.) in which a signal is transformable and dividable into signal components. Hence, in the frequency domain, each signal component relates to a single frequency bin in a single carrier communication system or, in a multicarrier CDMA communication system, each signal component relates to a single subcarrier of a spread signal that has a plurality of subcarriers. In a different domain such as the time domain, a signal component relates to, for example, a chip.

Figure 1:
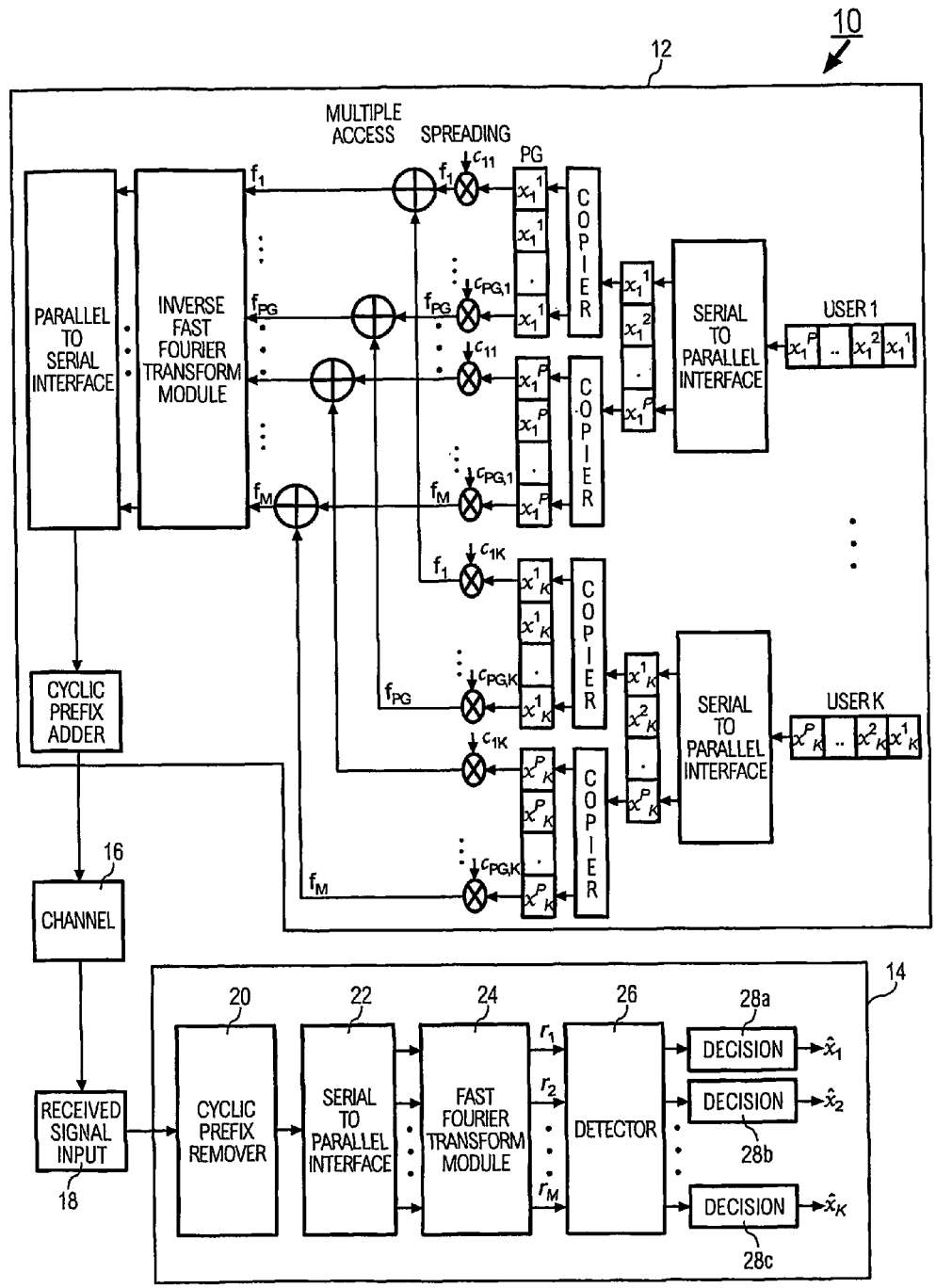
FIG. 1 is a general block diagram of a prior art MC-CDMA communication system having a transmitting section and a receiving section.

In the following description, an MC-CDMA communication system in which K active users are transmitting simultaneously and synchronously is used illustratively. As such, the signal components in this description relate to one or more subcarriers of a spread signal and therefore associated with the frequency domain. Signals from the K active users are processed for transmission by the transmitting section 12 of FIG. 1. Spread codes of the K active users are Walsh-Hadamard (WH) codes with a spreading factor $PG \geq K$ to ensure orthogonality between each other. For each user k (k=1, 2 ... K), Quadrature Phase Shift Keying (QPSK) modulated data sequence $x_k^t = \pm 1 \pm i$, t=1,2, ... is first converted into P parallel sequences, and then each sequence is spread onto PG subcarriers using corresponding WH codes of user k, $c_k = [c_{1k}, c_{2k}, \ldots, c_{PG,k}]^T$, where $c_{mk} = \pm 1$, m=1, ... PG and 't' denotes transpose operator. After combining with other users, all P×PG parallel data sequences are mapped onto M=P×PG available subcarriers and transformed into time domain by Inverse Fast Fourier Transform (IFFT). The parallel time-domain signal is first converted into serial and then added with a guard interval or cyclic prefix before transmitting on the channel 16.

To simplify the notation and without loss of generality, one of the P group signals that is transmitted by each user is considered hereafter, i.e. P=1 (M=PG). At the same time the superscript 't' may also be dropped in the data sequence $x_k^t$. Therefore, a signal transmitted in the frequency domain (before IFFT) $s = [s_1, s_2, \ldots, s_M]^T$ may be represented as:

$$s = C \cdot x \quad (1)$$

where $C = [c_1, c_2, \ldots, c_K]$ is the WH code matrix for all K active users and $x = [x_1, x_2, \ldots, x_K]^T$.

The channel 16 is assumed to be a slowly varying frequency selective Rayleigh fading channel corrupted by additive white Gaussian noise (AWGN). There is no inter-symbol interference because of the existence of a guard interval with duration larger than the channel delay spread.

At the receiver 14 for each user, samples of a received signal corresponding to the cyclic prefix are thrown away. After that, an FFT of size M is performed. The output vector after FFT, $r = [r_1, r_2, \ldots, r_M]^T$, referring to a transformed signal, can be written as $$r = \tilde{A} \cdot s + n = \tilde{A} \cdot C \cdot x + n \quad (2)$$

where $\tilde{A} = \text{diag}(\gamma_1, \gamma_2, \ldots, \gamma_M)$ is the influence of the channel (frequency domain) on M subcarriers and n is an M-by-1 AWGN vector.

To detect the signal after FFT, the prior art ORC detectors removes interference amongst different information symbols completely. To do so, the signal components or subcarriers have to be weighted with the inverse of a channel matrix, followed by multiplication of the matrix:

$$G = C^T \cdot \tilde{A}^{-1} = C^T \cdot \text{diag}(1/\gamma_1, 1/\gamma_2, \ldots, 1/\gamma_M) \quad (3)$$

As weak subcarriers are amplified with high gain, such weak subcarriers introduce a high level of noise. For this reason, prior art ORC detectors are noise-limited.

For prior art MMSE detectors, the signal is detected based on MMSE criterion, which is that an error must be orthogonal to all components of received subcarriers. Therefore, a weighting matrix for MMSE can be represented as:

$$G = C^T \cdot \hat{a} = C^T \cdot \text{diag}(\beta_1, \beta_2, \ldots, \beta_M) \quad (4)$$

where $\beta_m = \gamma^*_m / (K \cdot |\gamma_m|^2 + \sigma^2)$, m=1, ..., M, $\sigma^2$ is the noise power and '*' denotes conjugate operation. It is to be noted that for weak sub-carriers with small $\gamma_m$, $\beta_m$ is small to avoid the excessive noise amplification. While for strong subcarriers with large $\gamma_m$, $\beta_m$ is in proportion to the inverse of the subcarrier channel coefficient $1/\gamma_m$ to recover orthogonality amongst users.

Figure 2:
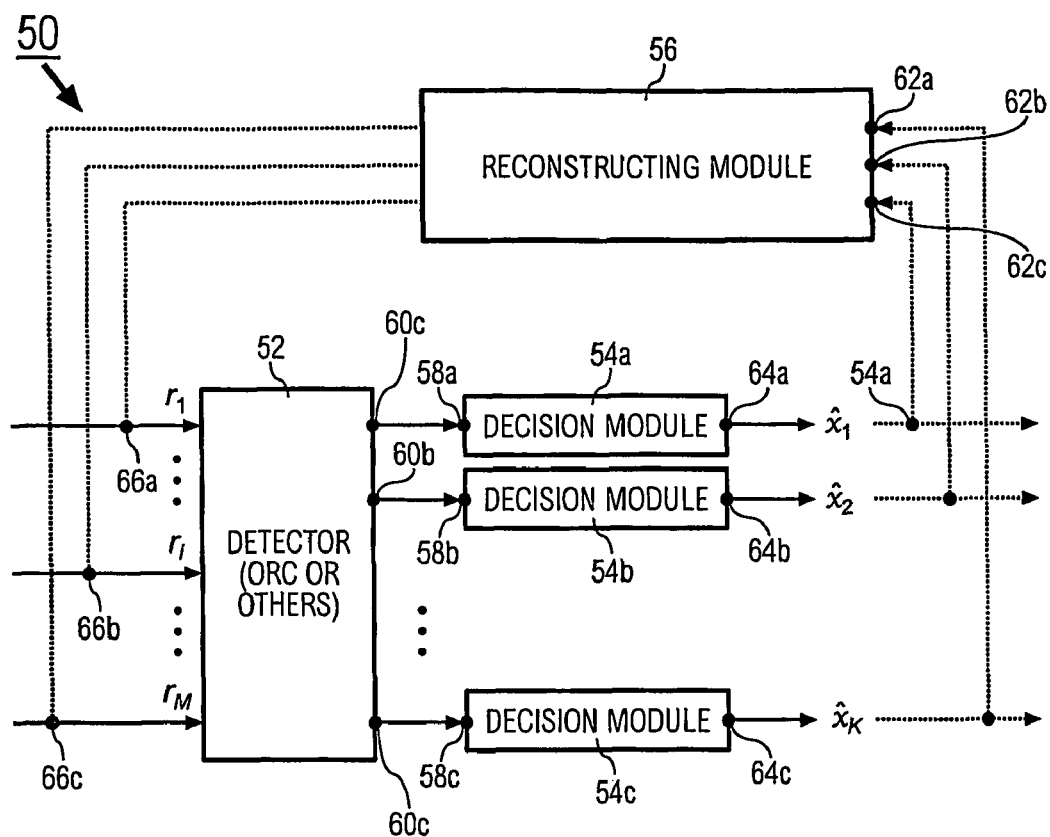
FIG. 2 is a general block diagram of a signal reconstructing section of a receiver for a communication system in accordance with the preferred embodiment.

Referring now to FIG. 2, a block diagram of a signal reconstructing section 50 of a receiver (not completely shown) of a communication system (not shown) in accordance with the preferred embodiment is illustrated. In describing the preferred embodiment, elements with a common function share a common reference number but are distinguished using non-capitalized alphabets.

The signal reconstructing section 50 comprises a detector 52 for detecting a transformed signal that has a plurality of subcarriers, one or more decision modules exemplified by three decision modules 54a, 54b, 54c, and a reconstructing module 56. The detector 52 can be, for example, an ORC, a TORC or an MMSE detector.

Each of the decision modules 54 is associated with a user and has an input 58 that is coupled to output 60 of the detector 52. Decision processing by the decision modules 54 is either hard decision or a combination of both hard decision and soft decision such as clipping functions.

The reconstructing module 56 has one or more inputs 62 respectively coupled to output 64 of the decision modules 54. Three inputs 62a,62b,62c of the reconstructing module 56 and three outputs 64a,64b,64c corresponding to the three decision modules 54a,54b,54c are illustratively indicated in FIG. 2.

The reconstructing module 56 is adapted to reconstruct one or more subcarriers of the plurality of subcarriers a predetermined number of times to thereby reduce noise in the transformed signal. Reconstruction of a subcarrier is based on a relationship between a received signal component and a transmitted signal. Subcarriers for reconstructing are identified based upon channel parameters. In the preferred embodiment of the invention, the channel parameters are channel amplitudes of the plurality of subcarriers, which is obtained from a channel estimation module (not shown) of the receiver 14.

Figure 3:
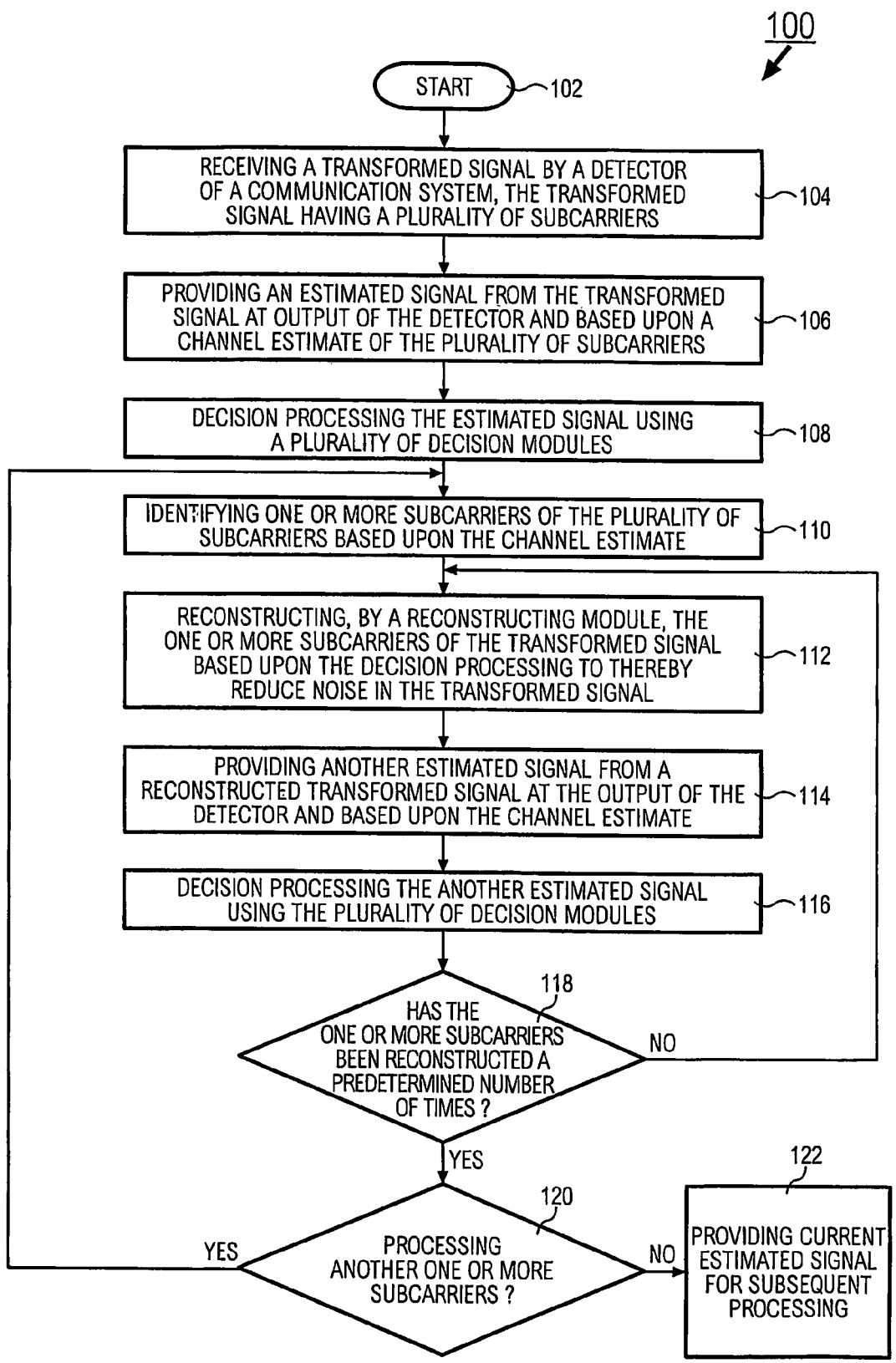
FIG. 3 is a flow chart of a method for iteratively reducing noise in a transformed signal received by the signal reconstructing section of FIG. 2.

To describe processing within the signal reconstructing section 50 in more detail, reference is now made to the flowchart of FIG. 3 that illustrates a method 100 for reducing noise that is introduced by amplification of weak subcarriers in the transformed signal. To simplify description of the method 100, a single signal component or subcarrier is used as an example in the following. However, it is to be noted that the FIG. 3 flowchart of the method 100 generalizes the single subcarrier as one or more subcarriers.

The method 100 starts at step 102 after which the transformed signal is received at step 104 by the detector 52. The detector 52 applies conventional detection such as, for example, ORC or MMSE, to obtain an estimate of vector x. The estimate $x^{(0)}$ is then provided from the transformed signal at step 106 at the output 60 of the detector 52 based upon $x^{(0)} = G \cdot r^{(0)}$, where G is given in equation (3) for ORC or equation (4) for MMSE and $r^{(0)} = r$ is the original transformed signal as expressed in equation (2).

Thereafter, the method 100 continues with decision processing the estimated signal using the decision modules 54 at step 108 and the estimated signal is obtained after decision $\hat{x}^{(0)} = \text{dec}(x^{(0)})$, where dec(·) stands for decision processing function.

A subcarrier is then identified from the plurality of subcarriers at step 110 based upon the channel parameter. The identified subcarrier is the weakest subcarrier with the smallest channel coefficient $\gamma_{i_0}$, $i_0 \in \{1, \ldots, M\}$).

Based upon the decision processing, one signal component of the transformed signal corresponding to the subcarrier that is identified is then reconstructed at step 112 by the reconstructing module 56 to provide a noise-reduced transformed signal. In other words, the estimate of vector x after decision, $\hat{x}^{(0)}$, is used to reconstruct the signal component corresponding to a subcarrier $i_0$ of the transformed signal based on:

$$\hat{r}_{i_0} = \gamma_{i_0} \cdot C_{i_0} \cdot \hat{x}^{(0)} \quad (5)$$

where $C_{i_0}$ denotes the $i_0$th row of C. Then the transformed signal is reconstructed by replacing the $i_0$th element of $r^{(0)}$ with $\hat{r}_{i_0}$. From equation (5), it is noted that the noise power of the reconstructed subcarrier, after multiplying with $1/\gamma_{i_0}$, depends on the decision errors of $\hat{x}^{(0)}$ only. If the decisions of elements in x are all correct, the reconstructed signal component $\hat{r}_{i_0}$ is error-free. For moderate and high signal-to-noise ratio (SNR), which is critical in communication systems related to the present invention, most elements of $\hat{x}^{(0)}$ are detected correctly after conventional detection. Thus, the noise power at the subcarrier $i_0$ after multiplying with $1/\gamma_1$ is less than the amplified noise power at the worst subcarrier. Therefore, replacing poor signal components of the transformed signal such as noisy subcarriers or the worst subcarrier with one or more reconstructed subcarriers thereby provides a noise-reduced transformed signal that, as an input to conventional detectors, improves overall system performance compared to an original transformed signal before any reconstruction.

Another estimated signal is then provided from the reconstructed signal at step 114 at the output 60 of the detector 52. Step 114 is similar in function to step 106. Such another estimated signal is then decision processed at step 116 using the decision modules 54. Step 116 is similar in function to step 108.

At decision step 118, the method 100 uses a counter to determine whether the subcarrier has been reconstructed the predetermined number of times. For a 'Yes' following the decision step 118, the method 100 proceeds to decision step 120 to determine whether to iterate the above processing steps for another subcarrier. Otherwise, for a 'No' following the decision step 118, the method 100 returns to step 112 to reconstruct the subcarrier another time.

At decision step 120, the method 100 determines whether to process another subcarrier according to the identifying step 110, the reconstructing step 112, the providing step 114, the decision processing step 116, and the decision step 118. For a 'Yes' following the decision step 120, the method 100 returns to the identifying step 110 to identify another subcarrier based upon the channel parameter. Otherwise, for a 'No' following the decision step 120, the method 100 proceeds to provide a current estimated signal of either before or after the decision processing step 116 for subsequent processing at step 122. Thereafter, the method 100 ends at step 124 following the providing step 122.

In each subsequent iteration numbered m following a 'Yes' from the decision step 120, another subcarrier is identified from remaining unidentified subcarriers of the plurality of subcarriers at step 110 based upon the channel parameter. It is to be noted that this sub-carrier $i_m$ is the weakest subcarrier in the remaining unidentified subcarriers at iteration m or the $m^{th}$ weakest subcarrier amongst the plurality of subcarriers. The transformed signal is updated in step 112 based on equation (5) where the index is "m" instead of "0". The method continues until a 'No' is met in the step 120 as described hereinbefore.

It should be noted that the identifying step 110 may be performed earlier in the method 100. Accordingly, each of the plurality of subcarriers can be identified and ranked in an order that is based upon channel amplitude before the providing step 106 as long as the receiver 14 has performed the channel estimation.

Also, the identifying step 110, the reconstructing step 112, the decision step 118, and the decision step 120 described in the above description of the method 100 are for processing and reconstructing one subcarrier for each iteration. In other words, for reconstructing one or more subcarriers, then each of the one or more subcarriers is reconstructed one at a time.

However, the identifying step 110, the reconstructing step 112, the decision step 118, and the decision step 120 could also be applied to simultaneously process and reconstruct two or more subcarriers of the one or more subcarriers for each iteration. For example, in a situation when the method 100 is applied to reconstruct a fixed number of subcarriers, then processing and/or reconstructing can be simultaneously performed for a multiple of the subcarriers. This multiple can therefore be two or more signal components of the signal components that are to be processed and/or reconstructed. In a special situation when all the subcarriers are simultaneously processed or reconstructed, then a 'Yes' at the decision step 118 proceeds directly to the step 122. Accordingly, in this special situation, the method 100 skips the decision step 120.

It should further be noted that processing the decision function at the decision processing steps 108 and 116 can be either hard decision or soft decision at each iteration as mentioned earlier. Based on an input x, output of the soft decision is described generally as a function of the input. For example, f(x) in the following clipping function being:

$$f(x) = \begin{cases} x & |x| < 1 \\ \text{sign}(x) & |x| \geq 1 \end{cases} \quad (6)$$

where $\text{sign}(\cdot)$ is the sign function taking a value ±1 may be used for a BPSK signal x=±1.

For QPSK signal, the clipping function may be applied to real and imaginary part separately. By using the clipping function, hard decision is made only for those bits with more energy, which is relatively robust to noise. For those bits with less energy and relatively liable to noise, soft decision is made and hopefully such bits receive some more energy at later iterations from the iterative error-correcting process described in the method 100.

ORC detector removes interference between different information symbols perfectly by inverting the channel matrix Γ. The method 100 does not change the orthogonality of information symbols. So the iterative ORC detector reduces the excessive noise without introducing error floor in high SNR. Although other conventional detectors like MMSE might alleviate the noise enhancement problem to some extent, applying the method 100 on these conventional detectors can significantly reduce enhanced noise.

For each iteration, the noise-reduced transformed signal may be regarded as a reconstructed transformed signal received at a virtual subcarrier corresponding to the weaker subcarrier. If all the current decisions are correct (error-free), the reconstructed transformed signal is also error-free. In other words, the virtual subcarrier is noise-free. If most of the decisions are correct where SNR is not extremely low, the power of the noise imposed on the virtual subcarrier will be less than its corresponding real subcarrier. Hence, replacing each of the plurality of subcarriers with a less noisy virtual carrier, one by one and iteratively, reduces the noise amplification smoothly.

Results of simulations of an MC-CDMA system in a frequency selective fading channel are next presented. Assuming that the duration of cyclic prefix is longer than the maximum delay spread, the channel for each subcarrier appears like a flat Rayleigh fading channel with a normalized power expectation value $E[|\gamma_k|^2]=1$. In the simulations, the number of subcarriers is set to be M=64.

Figure 4A:
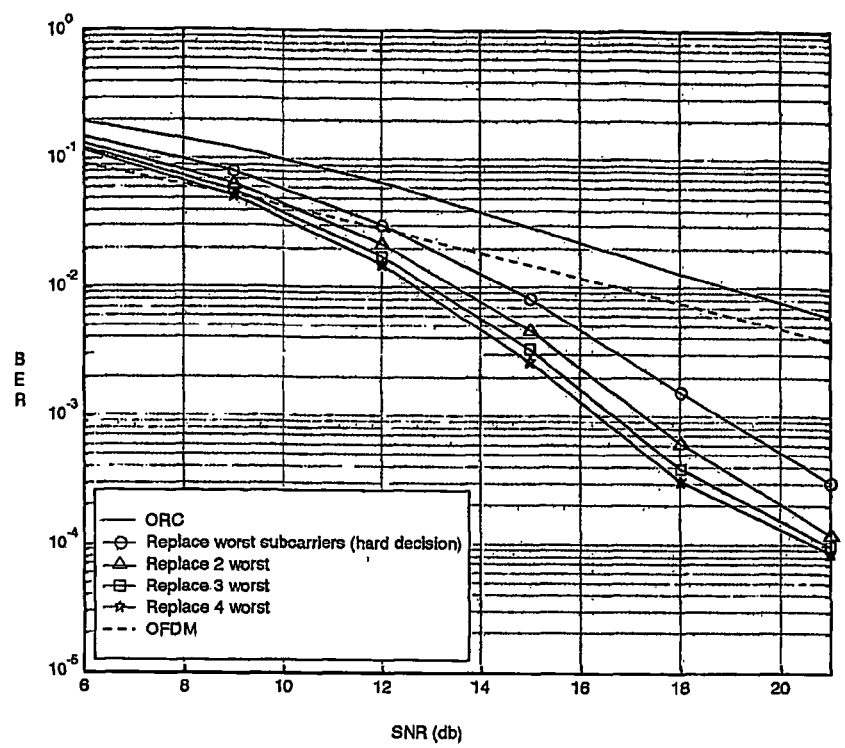
FIG. 4A shows graphs of BER vs. SNR of the transformed signal processed by the signal reconstructing section of FIG. 2 based upon hard decision compared with conventional ORC detectors.

FIG. 4A shows graphs of BER vs SNR of the transformed signal processed by the signal reconstructing section 50, applying hard decision processing in the decision modules 54, compared with conventional ORC detectors. The performance of the conventional OFDM system with one-tap equalization is also included in FIG. 4. As can be seen, the iterative detection scheme of the method 100 improves the BER performance significantly compared to ORC and conventional OFDM system. For BER at $10^{-2}$, the iterative algorithm of the method 100 with three or four reconstructed subcarriers outperforms ORC by about 6 dB and conventional OFDM system by about 4 dB. Even with a single reconstructed subcarrier, the iterative algorithm of the method 100 outperforms ORC and conventional OFDM systems by about 4 to 4.5 dB and 2 to 2.5 dB, respectively. With more subcarriers reconstructed, the performance improvement is less. Therefore, reconstructing a few subcarriers, which most influence overall performance, is sufficient to obtain desired performance improvement and this makes the signal reconstructing section 50 easy to implement.

Figure 4B:
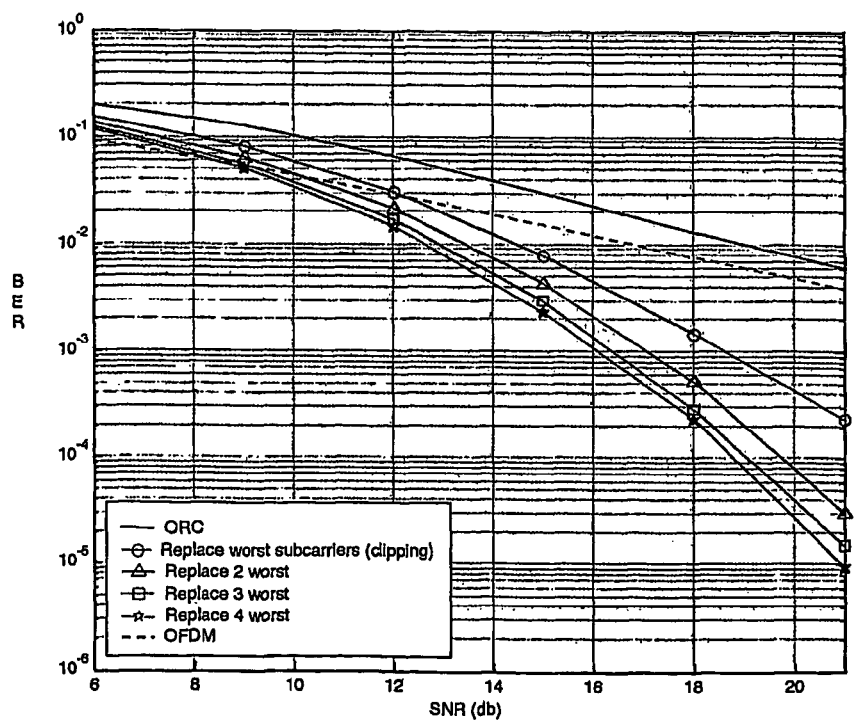
FIG. 4B shows graphs of BER vs. SNR of the transformed signal processed by the signal reconstructing section of FIG. 2 based upon clipping function compared with conventional ORC detectors.

Performance of the signal reconstructing section 50 using clipping function in each iteration of the method 100 is shown in FIG. 4B. Compared with FIG. 4A, the improvement for BER level down to $10^{-3}$ is trivial compared with using hard decision processing in this simulation. At the higher SNR area, the improvement is larger.

Figure 4C:
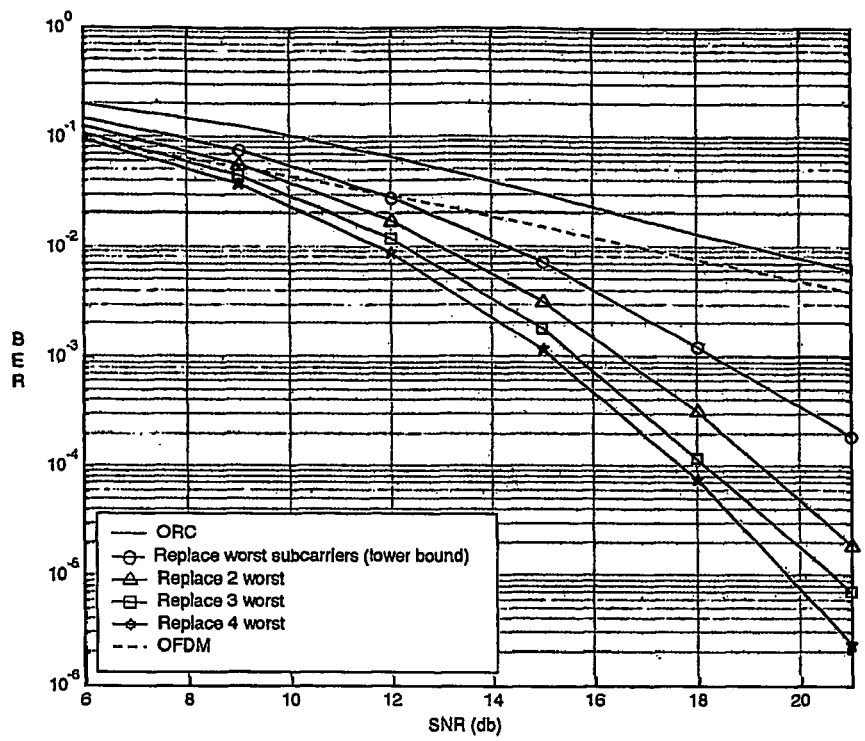
FIG. 4C shows graphs of BER vs. SNR of the transformed signal processed by the signal reconstructing section of FIG. 2, having a lower bound of BER, assuming correct decisions compared with conventional ORC detectors.

FIG. 4C shows the lower bound for iterative detection where actual transmitted data are used to reconstruct the noise-free transformed signal at virtual subcarriers to be reconstructed. It can be seen that the performance of the signal reconstructing section 50 using the method 100 approximates the lower bound well especially for the first few iterations. It is notable that the BER curves of the iterative detection show no error floor in the high SNR area.

Figure 5:
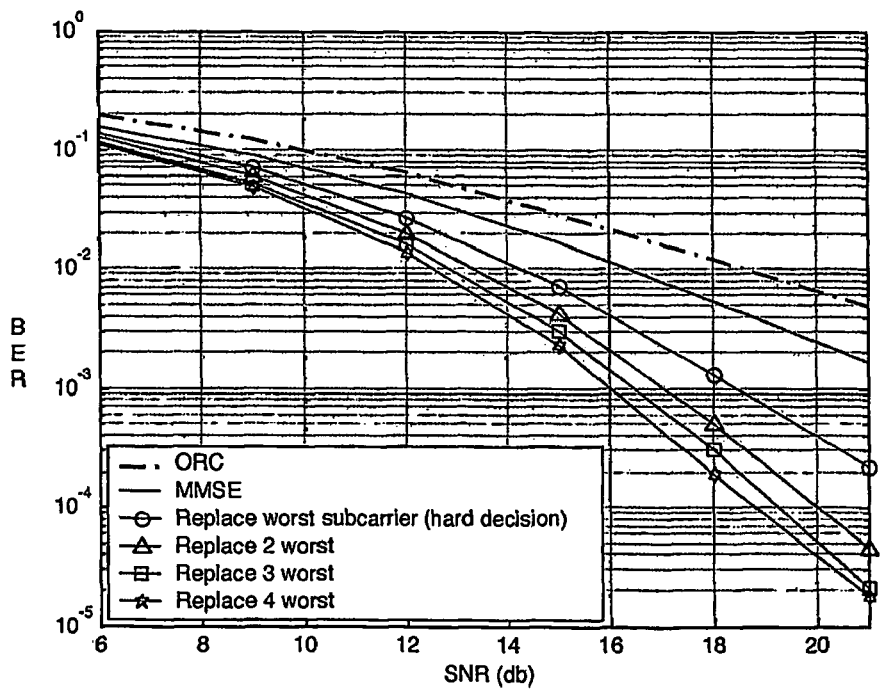
FIG. 5 shows graphs of BER vs SNR of the transformed signal processed by the signal reconstructing section of FIG. 2 compared with conventional MMSE detectors.

FIG. 5 illustrates the BER performance vs SNR of the transformed signal processed by the signal reconstructing section 50 using an MMSE detector as compared with a conventional MMSE detector. As can be seen at the BER level of $10^{-2}$, the MMSE detector with the signal reconstructing section 50 is observed to have a 2 dB improvement over ORC detectors as well, and alleviates noise enhancement problems. Applying the method 100 to reconstruct three or four subcarriers, the signal reconstructing section 50 applied in the MMSE detector obtains a 3.5 dB improvement over the conventional MMSE detector. Even reconstructing a single subcarrier, the signal reconstructing section 50 obtains a 2 dB improvement over the conventional MMSE detector.

Figure 6:
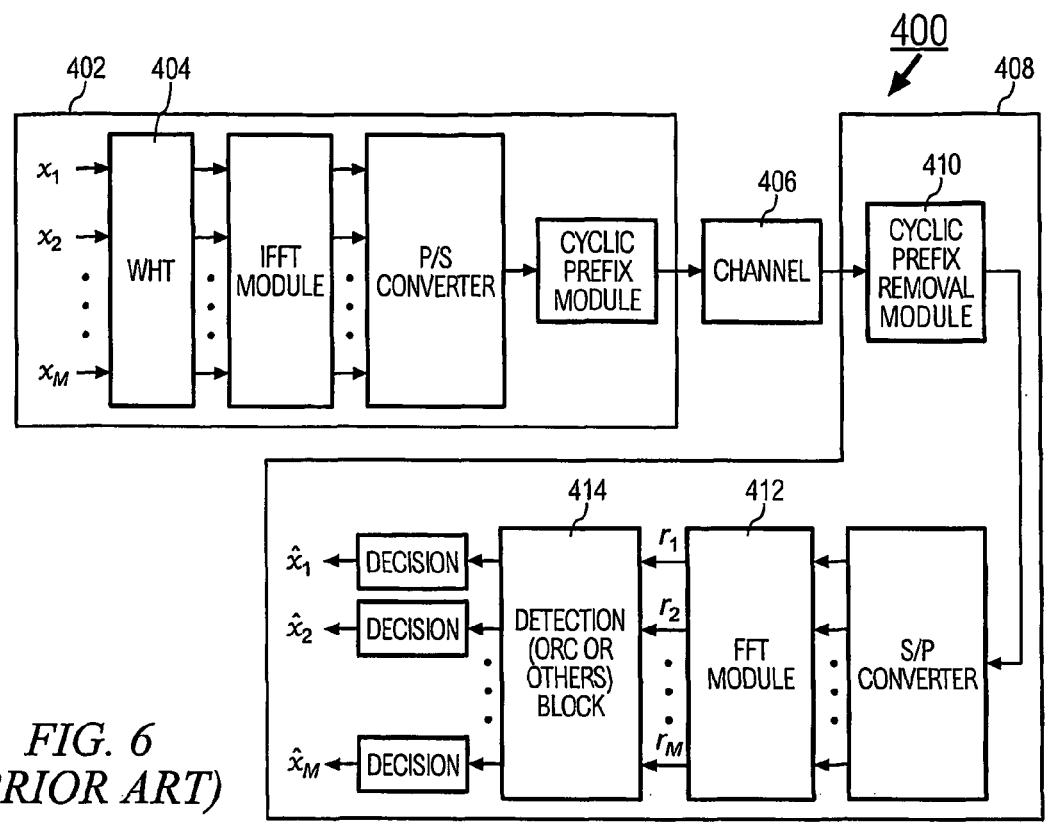
FIG. 6 is a general block diagram of a prior art Walsh Hadamard transformed OFDM (WHT-OFDM) system.

It is notable that the method 100 and the signal reconstructing section 50 can also be applied to other communication systems and not just MC-CDMA communication systems. For example, FIG. 6 illustrates a prior art Walsh Hadamard transformed OFDM (WHT-OFDM) system 400 that is a typical PT-OFDM communication system. For simplicity, a downlink communication system with $M=2^m$ subcarriers and M information symbols forming an OFDM block symbol is considered and assumes that the information symbols are QPSK-modulated or $x_k=\pm 1 \pm i$. The modulation symbols $s_k$ of the subcarriers are calculated from the information symbols $x_k$ using matrix operation $$s = W \cdot x \qquad (7)$$

where $s=[s_1, s_2, \ldots, s_M]^T$, $x=[x_1, x_2, \ldots, x_M]^T$, and W represents a WHT matrix of the order M. It is well known that the WHT matrix of the order M can be constructed by an iterative procedure:

$$W_2 = \begin{bmatrix} 1 & 1 \\ 1 & -1 \end{bmatrix}; \qquad (8)$$

$$W_{2k} = \begin{bmatrix} W_k & W_k \\ W_k & -W_k \end{bmatrix}$$

The main feature of a transmitter 402 in the WHT-OFDM system 400, as opposed to that in conventional OFDM system, is a WHT transform block 404 that is additionally implemented to spread the information symbols $x_k$ over the total bandwidth.

The channel 406 is assumed to be a slowly varying frequency selective Rayleigh fading channel corrupted by Additive White Gaussian Noise (AWGN). Because of the existence of a guard interval with duration larger than the channel delay spread, there is no inter-symbol interference.

At the receiver 408, a cyclic prefix remover 410 removes portions of a received signal corresponding to the cyclic prefix. After that, an FFT of size M is performed in an FFT module 412. The output vector after FFT, $r=[r_1, r_2, \ldots, r_M]^T$, can be written as:

$$r = \tilde{A} \cdot s + n = \tilde{A} \cdot W \cdot x + n \qquad (9)$$

where $\tilde{A}=\text{diag}(\gamma_1, \gamma_2, \ldots, \gamma_M)$ is the influence of the channel (frequency domain) on M subcarriers and n is the M-by-1 AWGN vector.

Comparing Equations (2) and (9), it is noted that the received frequency domain signal in the WHT-OFDM system 400 has the same form as in the MC-CDMA system 10, except W in this case is an M×M matrix instead of an M×K matrix C in MC-CDMA system. In fact, W can be regarded as a special case of C, where K=M. Furthermore, the receiver 408 structure of the WHT-OFDM system 400 is exactly the same as that in the MC-CDMA system 10 when P=1. Therefore, the same iterative detection scheme provided by the method 100 for MC-CDMA as described above is applicable to the WHT-OFDM system 400.

Figure 7:
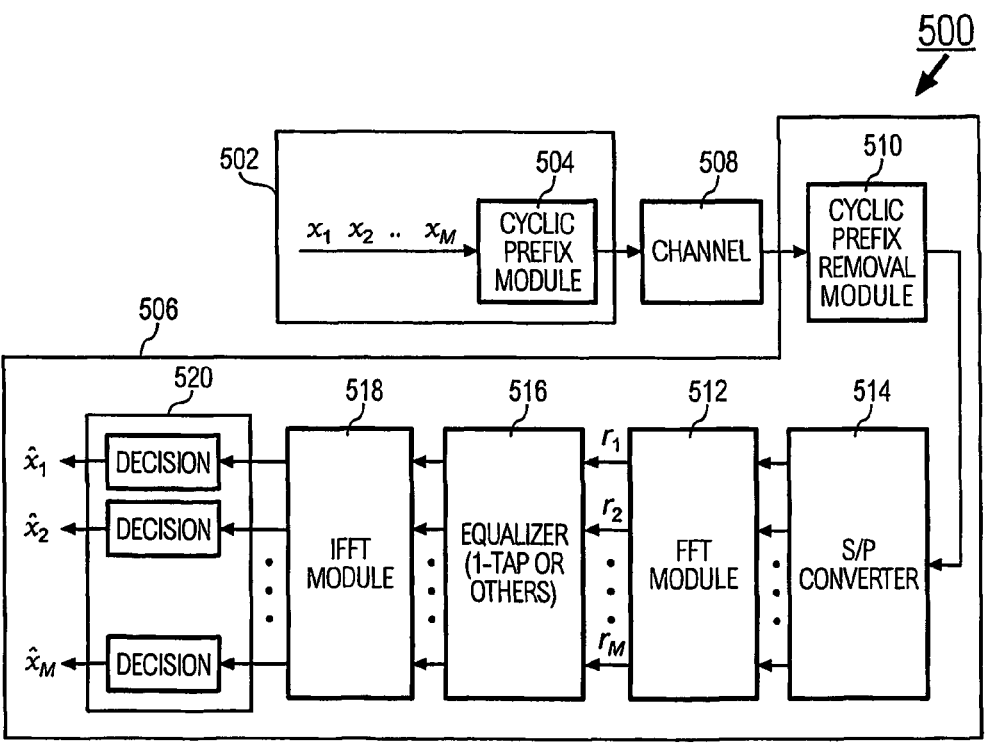
FIG. 7 is a general block diagram of a prior art single carrier frequency domain equalization (SC-FDE) receiver.

FIG. 7 illustrates a prior art single carrier frequency domain equalization (SC-FDE) system 500 as another example of a non-MC-CDMA communication system in which the method 100 and the signal reconstructing section 50 may be implemented. At the transmitter 502 of the SC-FDE system 500, the data sequence to be transmitted is first grouped into blocks with M symbols per block. For each block as shown in FIG. 7, a cyclic prefix is added by a cycle prefix module 504 before transmitting to a receiver 506 via a channel 508.

As for the earlier WHT-OFDM system 400, the channel 508 is assumed to be a slowly varying frequency selective Rayleigh fading channel corrupted by additive white Gaussian noise (AWGN). At the receiver 506, a cyclic prefix removal module 510 removes the cyclic prefix portion of a received signal. The remaining portion of the received signal is passed to an FFT module 512 after performing serial-to-parallel (S/P) conversion in an S/P module 514. The frequency domain signal from the outputs of the FFT module 512 is first fed to a frequency domain equalizer 516 and then converted back into the time domain in an IFFT module 518. Finally decision function is applied in decision modules 520 to get estimates of original transmitted data.

It can be seen that, comparing the systems 400, 500 of FIG. 6 and FIG. 7, the SC-FDE system 500 is actually a subset of PT-OFDM systems where the pre-transformation is set to FFT instead of WHT as in FIG. 6. Such a system is referred to in this description as a pre-FFT OFDM system. Since performing FFT and IFFT sequentially is equivalent to doing nothing, a transmitter of the pre-FFT OFDM system is identical to that of the SC-FDE system. At a receiver of the pre-FFT OFDM system, the function of a detection block 414 in FIG. 6 is equivalent to a combination of an equalization block and an IFFT block. For example, the ORC detection is actually a combination of one-tap equalization and inversion of the pre-transformation.

The present invention therefore provides the signal reconstructing section 50, a receiver having the signal reconstructing section 50, a communication system having the receiver and a method 100 for reducing noise in a transformed signal using the signal reconstructing section 50 to overcome, or at least alleviate, the problems of the prior art.

It will be appreciated that although only one preferred embodiment has been described in detail using different communication systems, various modifications and improvements can be made by a person skilled in the art without departing from the scope of the present invention.

The invention claimed is:

1. In a receiver of a communication system, a method for reducing noise in a transformed signal, said transformed signal having a plurality of signal components on different subcarriers which are orthogonal to each other, said method comprising the steps of:
    receiving the transformed signal by a detector of said communication system;
    processing the plurality of signal components of said received transformed signal by a plurality of decision modules coupled to said detector, wherein said processing step comprises:
        identifying one or more signal components having one or more smallest channel coefficients based upon a channel estimate of said plurality of signal components;
    reconstructing a predetermined number of times, by a reconstructing module coupled to outputs of said plurality of decision modules, said identified one or more signal components to thereby reduce noise in said identified one or more components;
    wherein said reconstructing further comprises an estimated signal from a reconstructed transformed signal at an input of said detector and based upon said channel estimate of said plurality of signal components; and
    replacing said identified one or more signal components having one or more smallest channel coefficients for reconstruction in said received transformed signal with the reconstructed one or more signal components to provide a new transformed signal having one or more reconstructed signal components with reduced noise;
    thereby outputting a new transformed signal with reduced noise.

2. The method as claimed in claim 1, wherein said processing step further comprises the step of decision processing said estimated signal using the plurality of decision modules.

3. The method as claimed in claim 2, wherein said decision processing step comprises the step of soft decision processing.

4. The method as claimed in claim 2, wherein said decision processing step comprises the step of hard decision processing.

5. The method as claimed in claim 1, wherein said reconstructing step further comprises the step of providing another estimated signal from said reconstructed transformed signal at said input of said detector and based upon said channel estimate.

6. The method as claimed in claim 5, wherein said processing step further comprises the step of decision processing said another estimated signal using said plurality of decision modules.

7. The method as claimed in claim 6, wherein said decision processing of said another estimated signal comprises the step of soft decision processing.

8. The method as claimed in claim 6, wherein said decision processing of said another estimated signal comprises the step of hard decision processing.

9. The method as claimed in claim 6, wherein said reconstructing step further comprises the step of determining whether said one or more signal components has been reconstructed said predetermined number of times.

10. The method as claimed in claim 9, wherein said reconstructing step further comprises the step of determining whether to process another one or more signal components of said plurality of signal components.

11. The method as claimed in claim 10, and further comprising the step of providing current estimated signal for subsequent processing when determined that iteration of said another signal component is not required.

12. The method as claimed in claim 10, wherein said reconstructing step further comprises the step of simultaneously reconstructing two or more of said another one or more signal components.

13. The method as claimed in claim 10, wherein said reconstructing step further comprises the step of reconstructing, one at a time, each of said another one or more signal components.

14. The method as claimed in claim 1, wherein said reconstructing step further comprises the step of simultaneously reconstructing two or more of said one or more signal components identified.

15. The method as claimed in claim 1, wherein said reconstructing step further comprises the step of reconstructing, one at a time, each of said one or more signal components.

16. A receiver for reducing noise in a transformed signal, said transformed signal having a plurality of signal components on different subcarriers which are orthogonal to each other, said receiver comprising:
    a signal reconstructing section having:
        a detector for detecting said transformed signal;
        a plurality of decision modules, each of said plurality of decision modules having an input coupled to output of said detector; and
        a reconstructing module having one or more inputs, said one or more inputs being respectively coupled to output of said plurality of decision modules,
        wherein said plurality of decision modules are adapted to identify one or more signal components having one or more smallest channel coefficients based upon a channel estimate of said plurality of signal components;
        wherein said identified one or more signal components are reconstructed a predetermined number of times to thereby reduce noise;
        wherein said reconstructing further comprises an estimated signal from a reconstructed transformed signal at an input of said detector and based upon said channel estimate of said plurality of signal components; and wherein the identified one or more signal components having one or more smallest channel coefficients for reconstruction are replaced with the reconstructed one or more signal components to thereby form a new transformed signal with reduced noise.

17. The receiver as claimed in claim 16, wherein each of said plurality of decision modules comprises one or more hard decision modules.

18. The receiver as claimed in claim 16, wherein each of said plurality of decision modules further comprises one or more soft decision modules.

19. The receiver as claimed in claim 16, wherein said reconstructing module is adapted to perform reconstruction based on a relationship between a received signal component and a transmitted signal.

20. The receiver as claimed in claim 16, wherein said reconstructing module is adapted to perform simultaneous reconstruction of two or more of said one or more signal components identified.

21. The receiver as claimed in claim 16, wherein said reconstructing module is adapted to perform reconstruction of said one or more signal components identified one at a time.

22. A communication system comprising:
    a signal reconstructing section for reducing noise in a transformed signal, said transformed signal having a plurality of signal components on different subcarriers which are orthogonal to each other, said signal reconstructing section having:
    a detector for detecting said transformed signal;
    a plurality of decision modules, each of said plurality of decision modules having an input coupled to output of said detector; and
    a reconstructing module having one or more inputs, said one or more inputs being respectively coupled to output of said plurality of decision modules,
    wherein said plurality of decision modules are adapted to identify one or more signal components having one or more smallest channel coefficients based upon a channel estimate of said plurality of signal components;
    wherein said identified one or more signal components are reconstructed a predetermined number of times to thereby reduce noise;
    wherein said reconstructing further comprises an estimated signal from a reconstructed transformed signal at an input of said detector and based upon said channel estimate of said plurality of signal components; and
        wherein the identified one or more signal components having one or more smallest channel coefficients for reconstruction are replaced with the reconstructed one or more signal components to thereby form a new transformed signal with reduced noise.

23. The communication system as claimed in claim 22, wherein each of said plurality of decision modules comprises one or more hard decision modules.

24. The communication system as claimed in claim 22, wherein each of said plurality of decision modules further comprises one or more soft decision modules.

25. The communication system as claimed in claim 22, wherein said reconstructing module is adapted to perform reconstruction based on a relationship between a received signal component and a transmitted signal.

26. The communication system as claimed in claim 22, wherein said reconstructing module is adapted to perform simultaneous reconstruction of two or more of said one or more signal components identified.

27. The communication system as claimed in claim 22, wherein said reconstructing module is adapted to perform reconstruction of said one or more signal components identified one at a time.

28. A signal reconstructing section for a receiver to reduce noise in a transformed signal, said transformed signal having a plurality of signal components on different subcarriers which are orthogonal to each other, said signal reconstructing section comprising:
    a detector for detecting said transformed signal;
    a plurality of decision modules, each of said plurality of decision modules having an input coupled to output of said detector; and
    a reconstructing module having one or more inputs, said one or more inputs being respectively coupled to output of said plurality of decision modules,
    wherein said plurality of decision modules are adapted to identify one or more signal components having one or more smallest channel coefficients based upon a channel estimate of said plurality of signal components;
    wherein said identified one or more signal components are reconstructed a predetermined number of times to thereby reduce noise;
    wherein said reconstructing further comprises an estimated signal from a reconstructed transformed signal at an input of said detector and based upon said channel estimate of said plurality of signal components; and
        wherein the identified one or more signal components having one or more smallest channel coefficients for reconstruction are replaced with the reconstructed one or more signal components to thereby form a new transformed signal with reduced noise.

29. The signal reconstructing section as claimed in claim 28, wherein each of said plurality of decision modules comprises one or more hard decision modules.

30. The signal reconstructing section as claimed in claim 28, wherein each of said plurality of decision modules further comprises one or more soft decision modules.

31. The signal reconstructing section as claimed in claim 28, wherein said reconstructing module is adapted to perform reconstruction based on a relationship between a received signal component and a transmitted signal.

32. The signal reconstructing section as claimed in claim 28, wherein said reconstructing module is adapted to perform simultaneous reconstruction of two or more of said one or more signal components identified.

33. The signal reconstructing section as claimed in claim 28, wherein said reconstructing module is adapted to perform reconstruction of said one or more signal components identified one at a time.

* * * * *